US012162734B2

(12) United States Patent
Stinson

(10) Patent No.: US 12,162,734 B2
(45) Date of Patent: Dec. 10, 2024

(54) TRANSFORMER LID LIFTING TOOL

(71) Applicant: MADI, LLC, Greenville, NC (US)

(72) Inventor: Ralph Dudley Stinson, Lutz, FL (US)

(73) Assignee: MADI, LLC, Greenville, SC (US)

( * ) Notice: Subject to any disclaimer, the term of this patent is extended or adjusted under 35 U.S.C. 154(b) by 777 days.

(21) Appl. No.: 17/315,489

(22) Filed: May 10, 2021

(65) Prior Publication Data

US 2021/0347619 A1 Nov. 11, 2021

Related U.S. Application Data

(60) Provisional application No. 63/021,804, filed on May 8, 2020.

(51) Int. Cl.
*B66F 19/00* (2006.01)

(52) U.S. Cl.
CPC .................................... *B66F 19/00* (2013.01)

(58) Field of Classification Search
CPC . B66F 19/00; B66F 15/00; B65G 7/08; B65G 7/12
USPC ........................................................... 294/17
See application file for complete search history.

(56) References Cited

U.S. PATENT DOCUMENTS

| | | | | | |
|---|---|---|---|---|---|
| 895,126 | A * | 8/1908 | Thomson | | |
| 1,041,949 | A * | 10/1912 | Bandemer | E04G 21/16 | 269/208 |
| 2,367,627 | A * | 1/1945 | Sterrett | B65G 7/12 | D8/71 |
| 4,072,335 | A * | 2/1978 | Tift | B66F 19/005 | 294/93 |
| 4,482,182 | A * | 11/1984 | Mortensen | B66F 19/005 | 254/131 |
| 5,004,282 | A * | 4/1991 | Perry | B66F 19/005 | 81/463 |
| 5,466,026 | A * | 11/1995 | Steiner | B65G 7/08 | 254/131 |
| 6,439,628 | B1 * | 8/2002 | Eslambolchi | B66F 19/005 | 294/34 |
| 6,868,570 | B2 * | 3/2005 | Sanders | B25B 13/48 | 7/138 |
| 9,493,331 | B2 * | 11/2016 | Montgomery | B65G 7/12 | |

* cited by examiner

*Primary Examiner* — Dean J Kramer
(74) *Attorney, Agent, or Firm* — Trego, Hines & Ladenheim, PLLC

(57) ABSTRACT

A transformer lid lifting tool is disclosed. The transformer lid lifting tool including a handle; a rail pivotally connected to the handle; and a hook connected to a first end of the rail and a magnet connected to a second end of the rail, the hook being configured to engage a bottom edge of a transformer lid.

14 Claims, 5 Drawing Sheets

TRANSFORMER LID LIFTING TOOL

BACKGROUND OF THE INVENTION

This invention relates generally to a tool, and more particularly to a tool used to lift a lid of a power transformer.

Power transformers are spaced throughout neighborhoods and along streets to provide power to residences and business. The transformers are typically in the form of a green colored, rectangular box that sits on the ground. The transformer has a lid pivotally connected to the box to allow authorized individuals to access the transformer and perform repairs or conduct routine maintenance of the transformer.

In order to perform such repairs or maintenance, the individual must bend down to the ground and lift the lid upward as a bottom of the lid is at ground level. Such a process creates risks to the individual. For example, bending over to lift the lid creates back strain and could result in a back injury. Further, by bending down, the individual's face is positioned next to the transformer which could expose the individual's face to flash.

Accordingly, there is a need for a tool that allows an individual to open a transformer lid while minimizing the potential for injury.

BRIEF SUMMARY OF THE INVENTION

This need is addressed by the present invention, which provides a tool which grabs a bottom of a lid of a power transformer and provides additional leverage to lift the lid upward.

According to one aspect of the invention, a transformer lid lifting tool includes a handle; a rail pivotally connected to the handle; and a hook connected to a first end of the rail, the hook being configured to engage a bottom edge of a transformer lid.

According to another aspect of the invention, a method of lifting a lid on a transformer using the transformer lid lifting tool includes the steps of positioning the hook under a bottom edge of a transformer lid; and using the handle to lift the transformer lid.

According to another aspect of the invention, a method of lifting a lid on a transformer includes the steps of providing a lid lifting tool having: a handle; a rail pivotally connected to the handle; and a hook connected to a first end of the rail and a magnet connected to a second end of the rail; and connecting the lid lifting tool to a transformer lid; and using the lid lifting tool to lift the transformer lid.

BRIEF DESCRIPTION OF THE DRAWINGS

The invention may be best understood by reference to the following description taken in conjunction with the accompanying drawing figures, in which.

DETAILED DESCRIPTION OF THE INVENTION

Figure 1:
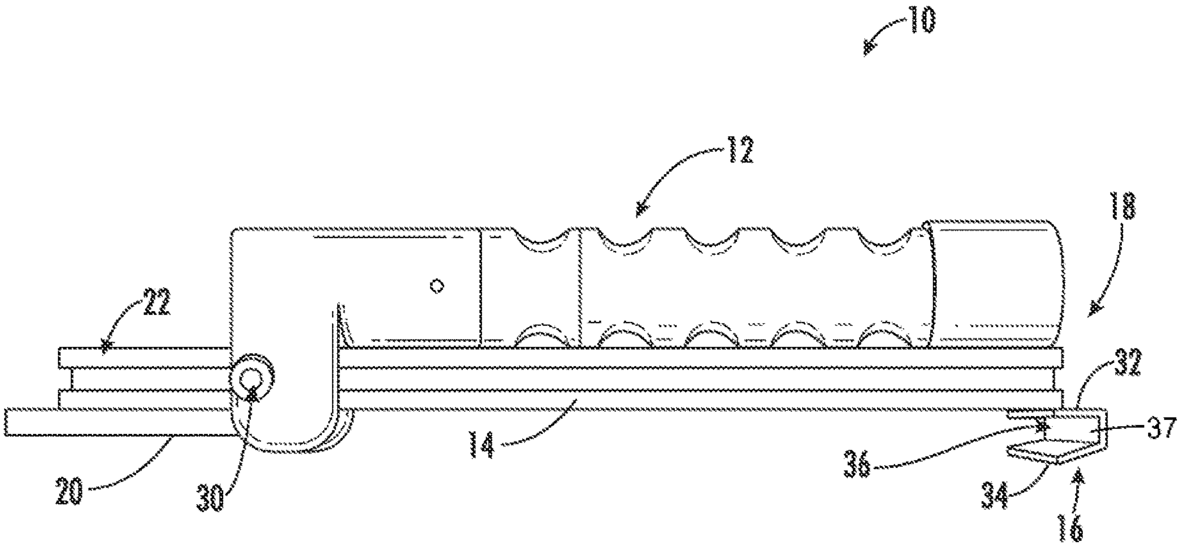
FIG. 1 shows a tool for lifting a lid of a power transformer in a stored position.
Figure 2:
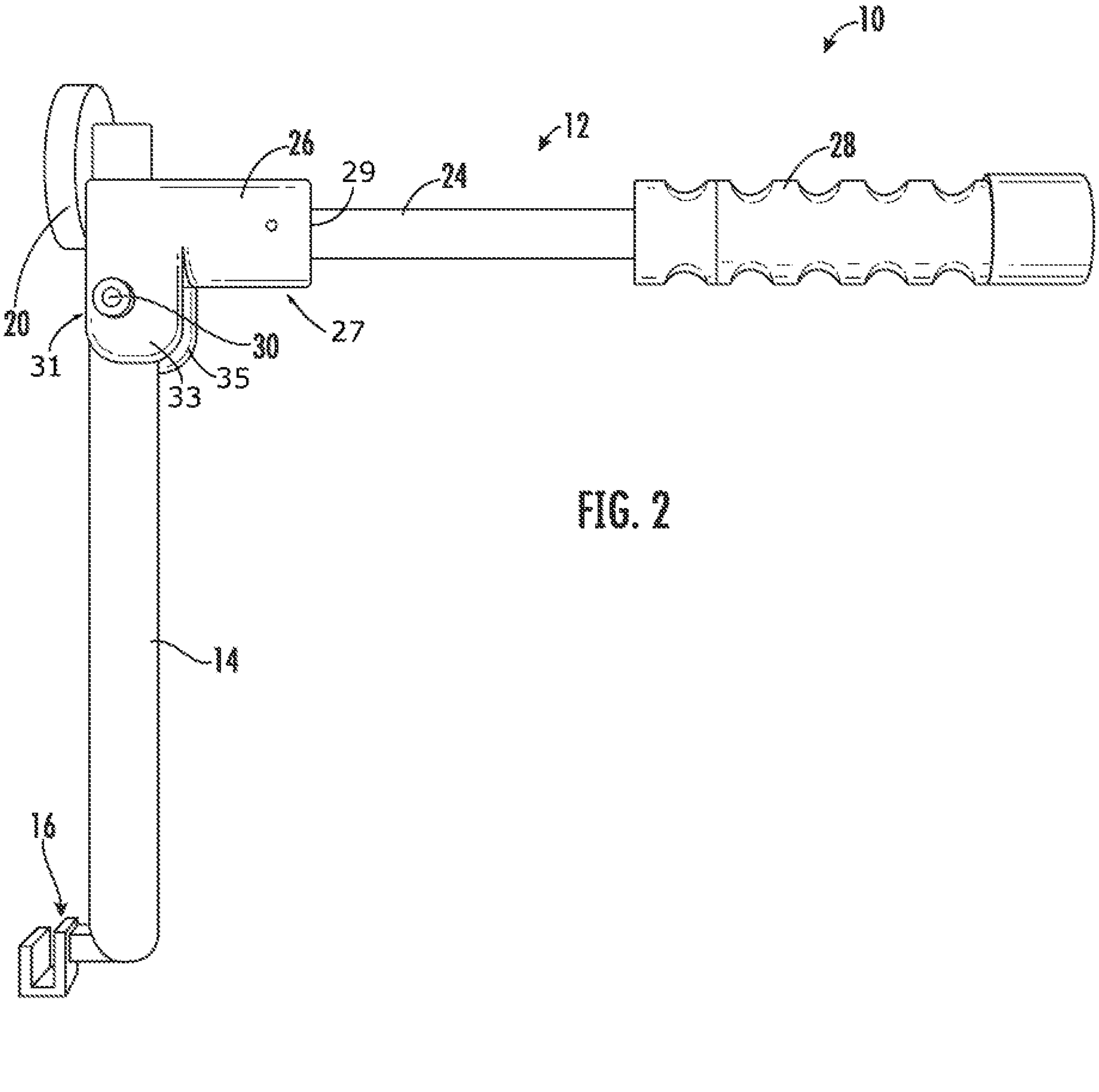
FIG. 2 shows the tool of FIG. 1 in an open position.

Referring to the drawings wherein identical reference numerals denote the same elements throughout the various views, FIGS. 1 and 2 illustrate a tool 10 for lifting a lid of a power transformer. The tool 10 including a handle 12, a rail 14 pivotally connected to the handle 12, a hook 16 connected to a first end 18 of the rail 14, and a magnet 20 connected to a second end 22 of the rail 14.

As shown, the handle 12 includes a central member 24, a rail attachment portion 26 and a hand grip 28. As illustrated, the hand grip includes a plurality of indentions to allow a user's fingers to engage the indentions and prevent slipping during use. It should be appreciated that other styles of hand grips may be used, for example, the hand grip may be made of a softer material, such as a foam, that allows the user to squeeze the hand grip during use or the hand grip may have a non-slip texture thereon to prevent slippage.

The central member 24 is fixedly connected to the rail attachment portion 26 and the hand grip 28 is slidably connected to the central member 24 to allow the handle 12 to extend in length and provide additional leverage. As illustrated, the rail attachment portion 26 is L-shaped and includes a first end 27 having a slot and/or hole 29 for receiving a portion of the central member 24 therein and a second end 31 having spaced-apart fingers 33 and 35 for receiving the rail 14 therebetween for pivotal movement.

The rail 14 is pivotally connected to the rail attachment portion 26 of the handle 12 by a pin or fastener 30 to permit the tool to move between a stored position, FIG. 1, and an open and/or use position, FIG. 2. As shown, the hook 16 is U-shaped and includes a back wall 32 connected to the rail 14, a bottom wall 37, and a front wall 34 spaced from the back wall 32. The back wall 32 and front wall 34 being connected together by the bottom wall 37 to form a groove 36 therebetween to permit a bottom edge and/or lip of a lid of a power transformer to rest in the groove 36. The magnet 20 secures the tool and/or handle portion to the lid so that the tool 10 stays in position while lifting the lid.

Figure 3:
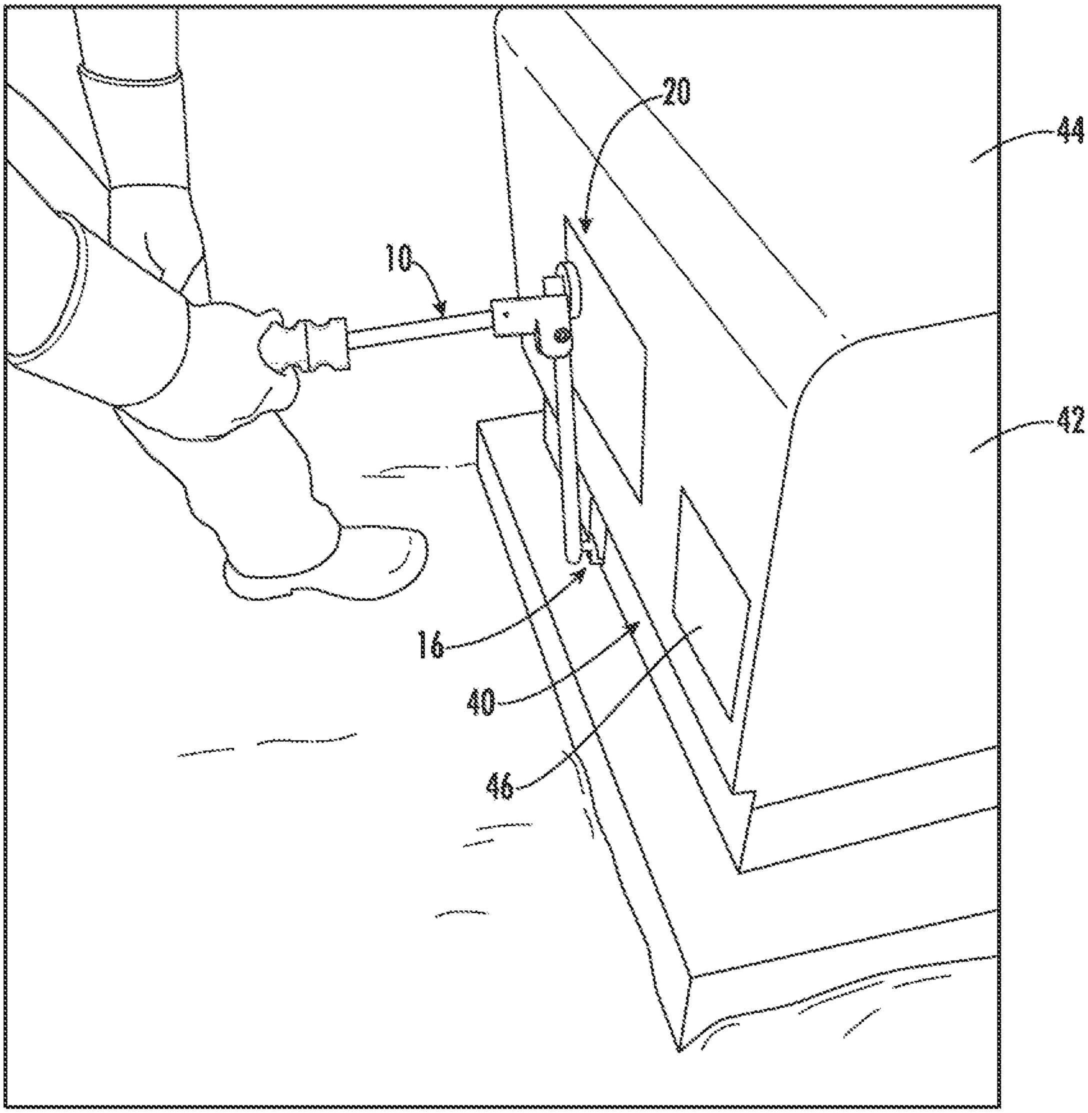
FIG. 3 shows the tool of FIG. 1 being attached to a lid of a power transformer.
Figure 4:
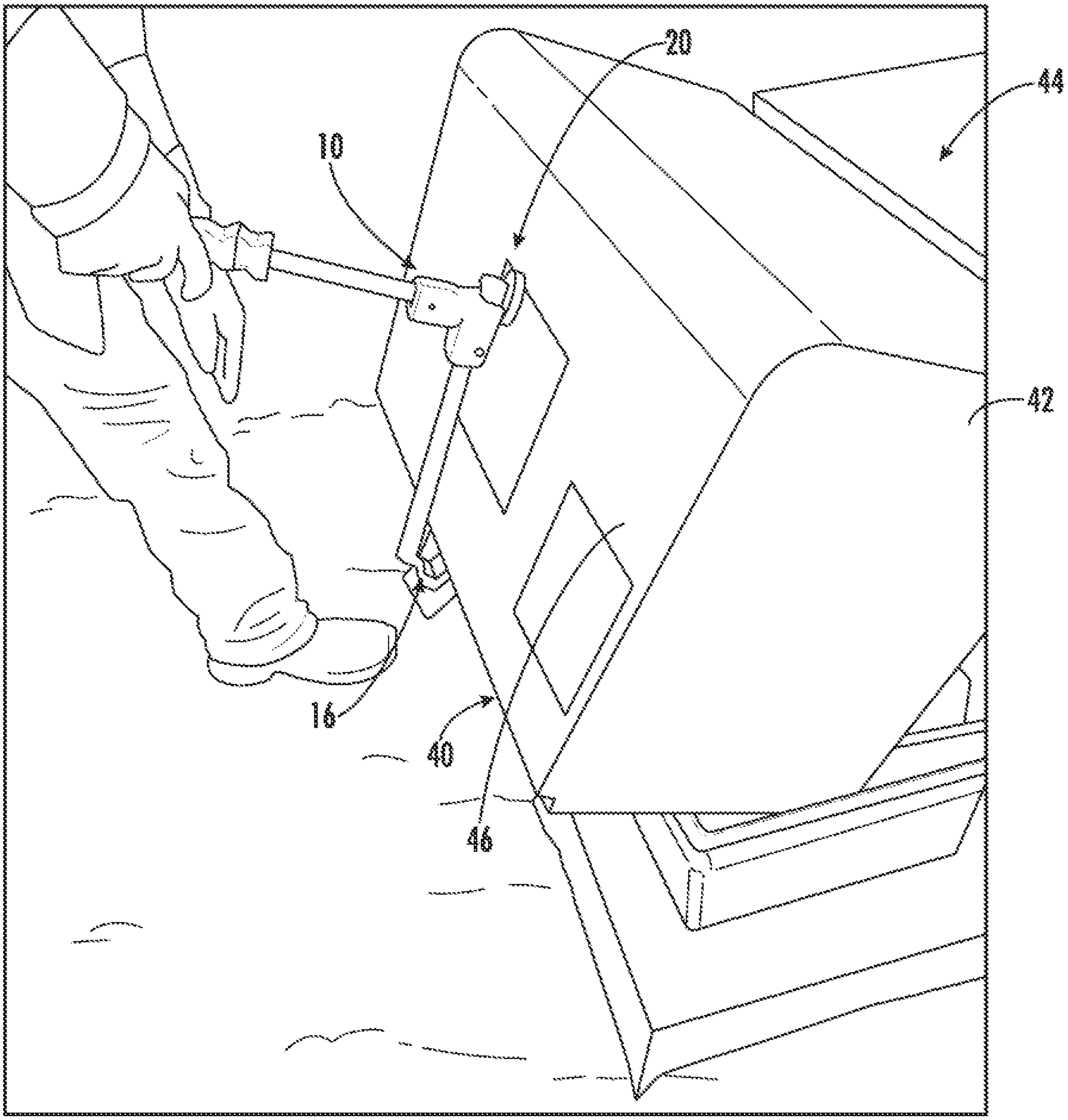
FIGS. 4 and 5 show the tool of FIG. 1 lifting the lid of the power transformer.
Figure 5:
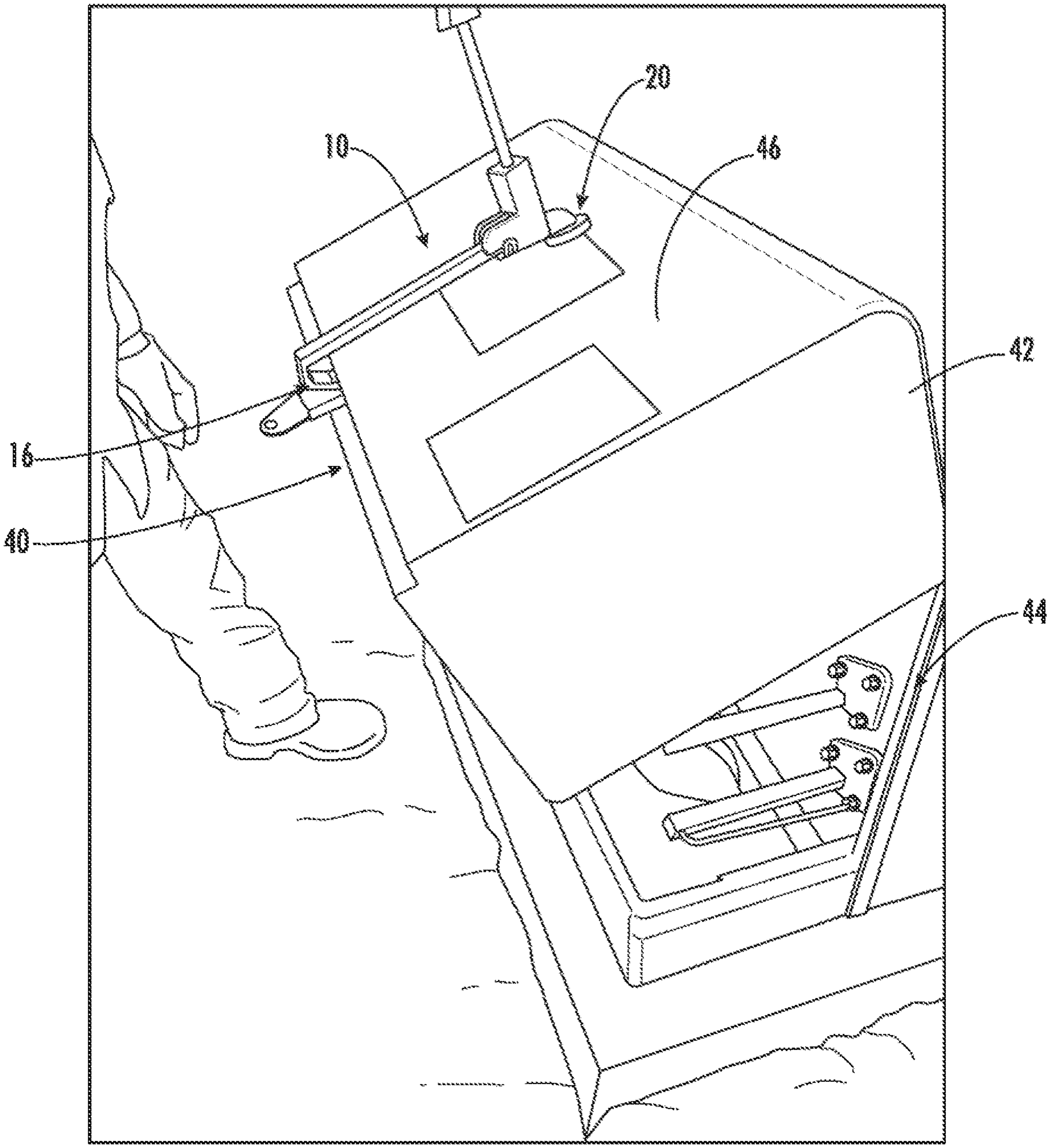

As illustrated in FIGS. 3-5, in use, a user moves the tool 10 from the stored position, FIG. 1, to the open position, FIG. 2 by pivoting the rail 14 away from the handle 12 to form an L-shaped tool. The user then slides the hand grip 28 away from the rail attachment portion 26 to move from a retracted position to an extended position; thereby, extending the handle 12.

Once the tool 10 has been moved to an open position and the handle 12 has been extended, the user places the hook 16 under a bottom edge 40 of a lid 42 of a power transformer 44. The bottom edge 40 is positioned in the groove 36. The magnet 20 is then engaged with a sidewall 46 of the power transformer 44 to secure the tool 10 thereto.

With the tool 10 secured to the lid 42, the user grips the hand grip 28 and lifts the lid 42 upward, thereby allowing the lid 42 to pivot from a closed position, FIG. 3, to an open position, FIG. 5. As shown, the tool 10 allows the user to lift the lid from an upright and/or standing position to prevent back injuries. Further, the design of the tool 10 and the extended handle increase the amount of leverage provided to the user, thereby allowing the user to use less energy and/or strength to lift the lid 42. It is estimated that the tool 10 provides an increase in leverage of up to 5 times of what a user would have if bending over and lifting with his/her hands.

The foregoing has described a tool lifting a lid of a power transformer. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends any novel one, or any novel combination, of the features disclosed in this specification (including any accompanying claims, abstract and drawings), or to any novel one, or any novel combination, of the steps of any method or process so disclosed.

I claim:

1. A transformer lid lifting tool, comprising:
- a handle;
- a rail pivotally connected to the handle; and
- a hook connected to a first end of the rail and a magnet connected to a second end of the rail, the hook being configured to engage a bottom edge of a transformer lid.

2. The transformer lid lifting tool according to claim 1, wherein the handle includes:
- a central member;
- a hand grip slidably connected to the central member; and
- a rail attachment portion fixedly connected to the central member.

3. The transformer lid lifting tool according to claim 2, wherein the rail attachment portion includes:
- a first end having a slot configured to receive a portion of the central member therein; and
- a second end having spaced-apart fingers configured to receive the rail therebetween for pivotal movement.

4. The transformer lid lifting tool according to claim 2, wherein the rail is pivotally connected to the rail attachment portion.

5. A method of lifting a lid on a transformer using the transformer lid lifting tool of claim 1, comprising the steps of:
- moving the transformer lid lifting tool from a stored position to a use position by pivotally moving the rail away from the handle and sliding a hand grip of the handle from a retracted position to an extended position;
- positioning the hook under a bottom edge of a transformer lid; and
- using the handle to lift the transformer lid.

6. The method according to claim 5, wherein the bottom edge is positioned in a groove of the hook.

7. The method according to claim 5, further including the step of positioning a magnet connected to a second end of the rail against the transformer lid such that the magnet engages the transformer lid and secures the transformer lid lifting tool thereto.

8. A method of lifting a lid on a transformer, comprising the steps of:
- providing a lid lifting tool having:
  - a handle;
  - a rail pivotally connected to the handle; and
  - a hook connected to a first end of the rail and a magnet connected to a second end of the rail; and
- connecting the lid lifting tool to a transformer lid; and
- using the lid lifting tool to lift the transformer lid.

9. The method according to claim 8, wherein the step of connecting the lid lifting tool to the transformer lid includes the step of hooking the hook to a bottom edge of the transformer lid.

10. The method according to claim 9, wherein the step of connecting the lid lifting tool to the transformer lid further includes the step of engaging the magnet with the transformer lid to secure the lid lifting tool to the transformer lid.

11. The method according to claim 9, wherein the bottom edge is positioned in a groove of the hook.

12. The method according to claim 8, wherein the step of using the lid lifting tool further includes the step of using the handle to lift the transformer lid upwardly.

13. The method according to claim 8, further including the step of moving the lid lifting tool from a stored position to a use position by pivotally moving the rail away from the handle.

14. The method according to claim 13, wherein the step of moving the lid lifting tool from a stored position to a use position further includes the step of sliding a hand grip of the handle from a retracted position to an extended position.

* * * * *